Patented Feb. 12, 1952

2,585,036

UNITED STATES PATENT OFFICE 2,585,036

PREPARATION OF NOVEL FOOD PRODUCTS FROM RICE

Robert L. Roberts, Piedmont, Calif., assignor to the United States of America as represented by the Secretary of Agriculture No Drawing. Application September 27, 1949, Serial No. 118,181

4 Claims. (Cl. 99—80)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to me of any royalty thereon.

This invention relates to the processing of rice. In particular, it relates to the preparation of novel food products from rice.

It has been found that if rice is subjected to a particular sequence of steps, as hereinafter described, the rice is converted into products of novel properties and flavor. The products are golden brown in color, they have a crisp texture and can be eaten directly. The products are eminently suited for out-of-hand eating and are excellent as an hors d'œuvre or as a supplement to beverages or soups. The products can be packaged in sealed containers or in paper or cellophane bags and retain their flavor and crispness for extended periods of time.

The raw material for the process is generally white rice, preferably broken grades thereof which are available at a much lower price than head rice. Instead of white rice one can also use brown rice or parboiled rice.

The novel products of this invention are produced as follows:

Rice is ground into a meal. In general, a meal which will pass through a sieve from about 16 to about 24 mesh is satisfactory. The particle size need not be rigorously controlled and even large proportions of fines can be tolerated. The aim is to obtain a meal which when mixed with hot water will readily form a paste without clumping.

In the next step of the process, the meal is mixed with hot water. This process involves agitating a mixture of the meal and hot water until the components are thoroughly blended and a solid uncooked paste is formed due to the gelatinization of the starch in the rice. Generally, water at a temperature from about 190° F. to 212° F. is used so as to accelerate the blending and gelatinization. The proportion of meal and water is important as it affects the oil content of the final product. Thus it has been observed that a high proportion of rice meal to water results in a product of low oil content whereas a lower proportion of rice meal to water results in a product of increased oil content. Thus for preparing products of minimum oil content I use rice meal and water in approximately equal proportions. If products of higher oil content are desired, one can use a proportion as low as 0.75 part of rice meal per part of water. The effect of varying the proportions of meal and water is shown in the examples herein.

The resulting uncooked paste is then formed into any desired shape. I prefer a rod-shape as yielding a product of low oil content and having a firm, even-textured outer shell and a highly porous interior. Such rod-shapes may be prepared most readily by extruding the paste through a die having a circular orifice. The length of the rods is of course immaterial but the diameter should be from about $\frac{1}{8}''$ to about $\frac{1}{4}''$ so that the pieces will be uniformly cooked in a short time. If desired, the paste may be formed into rods having an oval, square, or rectangular cross-section. For convenience in handling the rice paste it is usually cooled before being formed into the selected shape.

The resulting shaped rice paste is then cooked in oil. Any edible oil can be used, for example, soybean oil, cottonseed oil, peanut oil, corn oil, sesame seed oil, lard, hydrogenated vegetable oils, etc. The temperature of the oil should be from about 375° F. to about 425° F., 390° F. being preferred. The paste is cooked in the oil until the "boiling," which is caused by expelling of steam from the paste, ceases. Proper cooking usually takes about 2 to 3 minutes.

Flavoring agents and/or additional nutrients can be added to the products after they have been cooked. For example, the products may be dusted with salt or with a mixture of salt and monosodium glutamate. Further, the products may be coated with cheese. Another convenient point at which flavors or nutrients may be added is during the pasting step when the meal is mixed with hot water. Thus during this mixing one may add flavoring agents such as salt, monosodium glutamate, pepper, etc. or nutrients such as vitamins, cheese, proteins, rice polish, rice bran, other cereal grains, ground dry vegetables such as carrots, peas, corn, etc.

The following examples describe particular steps, materials, and conditions within the scope of this invention, but it is to be understood that these examples are given only by way of illustration and not limitation.

EXAMPLE I

White rice was ground to pass through a 20-mesh sieve. A 100-gram portion of the ground rice was added to 100 ml. of boiling water. The mixture was stirred until thoroughly blended (about ½ minute) then cooled to room temperature. The paste was then extruded through an orifice 1/16" in diameter into a bath of peanut oil maintained at 390° F. and cooked in the oil bath until ebullition of moisture had ceased (2¾ minutes). The product in the form of rods having a diameter of about 1/16" to ¼" had a golden brown color, a crisp texture and contained 15% oil.

EXAMPLE II

Samples of ground white rice were mixed with boiling water in various proportions as indicated below. In each case, the resulting paste was extruded through an orifice 1/16" in diameter into sesame seed oil and cooked in the oil until ebullition of moisture had ceased. The proportions, conditions, and results are set forth in the following able:

Table

| Expt. No. | Proportion of rice, grams of rice per 100 ml. water | Temperature of oil, °F. | Cooking time, minutes | Oil content of product, Per Cent |
|---|---|---|---|---|
| 1 | 50 | 390 | 2¾ | 37 |
| 2 | 50 | 425 | 2½ | 39 |
| 3 | 75 | 390 | 2¾ | 26 |
| 4 | 75 | 425 | 2½ | 27 |
| 5[1] | 75 | 390 | 3¼ | 25 |
| 6[1] | 75 | 425 | 3 | 23 |
| 7 | 100 | 390 | 2¾ | 20 |
| 8 | 100 | 425 | 2¼ | 18 |

[1] In experiments 5 and 6 the whole rice was ground to pass through a 24-mesh sieve whereas in the other experiments, the white rice was ground to pass through a 16-mesh sieve.

Having thus described the invention, what is claimed is:

1. A process for preparing food products from rice comprising mixing rice meal with hot water in the proportion of from about 0.75 to about 1 part of rice meal per part of water to produce an uncooked paste, forming the resulting uncooked paste into an elongated shape having a thickness from about ⅛" to about ¼", and cooking the resulting shaped paste in oil at a temperature from about 375° F. to about 425° F.

2. A process for preparing food products from rice comprising mixing rice meal with hot water in approximately equal proportions to produce an uncooked paste, forming the resulting uncooked paste into an elongated shape having a thickness from about ⅛" to about ¼", and cooking the resulting shaped paste in oil at a temperature from about 375° F. to about 425° F.

3. A process for preparing food products from rice comprising grinding white rice to prepare a meal which will pass through a sieve from about 16 to about 24 mesh, mixing the rice meal with hot water in the proportion of from about 0.75 to about 1 part of rice meal per part of water to produce a solid, uncooked paste, forming the resulting solid, uncooked paste into an elongated shape having a thickness from about ⅛" to about ¼", and cooking the resulting shaped paste in oil at a temperature from about 375° F. to about 425° F.

4. A process for preparing food products from rice comprising grinding white rice to prepare a meal which will pass through a sieve from about 16 to about 24 mesh, mixing the rice meal with hot water in approximately equal proportions to produce a solid, uncooked paste, forming the resulting solid, uncooked paste into an elongated shape having a thickness of about ¼", and cooking the resulting shaped paste in oil at a temperature from about 375° F. to about 425° F.

ROBERT L. ROBERTS.

REFERENCES CITED

The following references are of record in the file of this patent:

UNITED STATES PATENTS

| Number | Name | Date |
|---|---|---|
| 1,926,347 | Morrow | Sept. 12, 1933 |
| 1,945,947 | McKay | Feb. 6, 1934 |
| 2,002,053 | Doolin | May 31, 1935 |
| 2,011,050 | Greenwood | Aug. 13, 1935 |

OTHER REFERENCES

Ward: Encyclopedia of Food, published by Artemus Ward, 50 Union Sq., N. Y., 1923, page 445.

Winton: Structure and Composition of Foods, vol. I, page 135.